(12) United States Patent
Torgersen (10) Patent No.: US 11,885,581 B2
(45) Date of Patent: Jan. 30, 2024

(54) GAS-BLOCKING AMBIDEXTROUS FIREARM CHARGING HANDLE AND LOWER RECEIVER

(71) Applicant: Silencerco, LLC, West Valley City, UT (US)

(72) Inventor: James Torgersen, West Valley City, UT (US)

(73) Assignee: Silencerco, LLC, West Valley City, UT (US)

( * ) Notice: Subject to any disclaimer, the term of this patent is extended or adjusted under 35 U.S.C. 154(b) by 0 days.

(21) Appl. No.: 18/086,199

(22) Filed: Dec. 21, 2022

(65) Prior Publication Data

US 2023/0204310 A1    Jun. 29, 2023

Related U.S. Application Data

(60) Provisional application No. 63/293,318, filed on Dec. 23, 2021.

(51) Int. Cl.
*F41A 3/72* (2006.01)
*F16J 15/02* (2006.01)
*F41A 35/06* (2006.01)
*F41A 3/66* (2006.01)

(52) U.S. Cl.
CPC .............. *F41A 3/72* (2013.01); *F16J 15/02* (2013.01); *F41A 3/66* (2013.01); *F41A 35/06* (2013.01)

(58) Field of Classification Search
CPC ........................................................ F41A 3/72
USPC ........................................................ 89/1.42
See application file for complete search history.

(56) References Cited

U.S. PATENT DOCUMENTS

| | | | | |
|---|---|---|---|---|
| 6,311,603 B1 * | 11/2001 | Dunlap | ..................... | F41A 3/72 42/2 |
| 9,677,833 B2 * | 6/2017 | Kincel | ..................... | F41A 3/72 |
| 10,247,496 B2 * | 4/2019 | Kincel | ..................... | F41A 3/72 |

* cited by examiner

*Primary Examiner* — Reginald S Tillman, Jr.
(74) *Attorney, Agent, or Firm* — Holland & Hart LLP (57) ABSTRACT

A sealing member configured to fill the gap between a charging handle and an lower receiver. The sealing member may be disposed in a charging handle that forms a seal against the receiver to prevent the escape of discharge gas from the interface between the charging handle and the receiver. The sealing member may be disposed on the top surface of the lower receiver at the charging handle-lower receiver interface.

18 Claims, 6 Drawing Sheets

Section A-A

GAS-BLOCKING AMBIDEXTROUS FIREARM CHARGING HANDLE AND LOWER RECEIVER

CROSS REFERENCE

The present Application for Patent claims benefit of and priority to U.S. Provisional Patent Application No. 63/293,318 by Torgersen, entitled "Gas-Blocking Ambidextrous Firearm Charging Handle and Lower Receiver," filed Dec. 23, 2021, assigned to the assignee hereof, and is expressly incorporated by reference in its entirety herein.

TECHNICAL FIELD

The present disclosure relates generally to a firearm charging handle. More particularly, the disclosure relates to a sealing member disposed either on top of a lower receiver or on the bottom of a charging handle so as to block gases that are expelled from the gap between the bottom of the charging handle and the upper and lower receiver.

BACKGROUND

The firearm charging handle, responsible for retracting the bolt, opening the breech and cocking the hammer, allows the operator to open the breech and eject a spent shell from the chamber, leaving the chamber ready for a new round. The charging handle may also be used to open breech and allow the operator to inspect maintain the chamber.

Some charging handles have a gap between the bottom of the charging handle and the main body of the firearm (specifically the upper and lower receivers) which allow discharge gasses to puff into the operator's face during firing, especially when shooting suppressed. Ambidextrous charging handles utilize two springs with a plunger bias to bias the handles/levers into the locked position.

In direct impingement firearms, after the cartridge is fired and the bullet moves down the bore and passes the gas port, a portion of gas is channeled into the gas tube and returned into back to the receiving unit into a chamber in the bolt carrier group, forcing the carrier rearwards away from the bolt. The gas then escapes gas through vents. When shooting an AR platform with a suppressor the shooter often gets a significant amount of gas in the face. The charging handle eliminates gas in the face when shooting and AR platform with a suppressor.

The dynamics of this gas flow change when a suppressor is attached to the muzzle of a firearm. With the addition of a suppressor the amount of time gas is forced through the gas port increases, forcing an overwhelming amount of gas into the bolt carrier group chamber. Due to the high speed and ephemeral nature of the gas, there is difficulty identifying the main location from which the gas is expelled into the operator's face.

As a result of the excess gas and pressure, gas is forced through the upper receiving unit and along the channel housing the charging handle, where it escapes, often into the face of the operator. As a result there is a need for an improved gas blocking A barrier would be no on identifying the main location from which the gas was expelled into the shooters face. Something that facilitated the invention was high speed video of visible smoke clouds being expelled from the firearm allowing identification of the area causing gas in the operator's face while shooting an AR-15 with a suppressor.

The longevity of the elastic material (O-ring). After 1000 cycles of the charging handle the O-ring still blocked any gases from being expelled from between the charging handle and the main body of the firearm into the operators face. The location that gases were expelled from the firearm into the operators face.

trous firearm charging handle to mitigate or eliminate the discharge of gas from the space between the charging handle and the receiving unit.

BRIEF SUMMARY

The general purpose of the apparatuses and methods disclosed herein is to provide an improved charging handle. Specifically, a charging handle is disclosed which prevents gas from being expelled from the gap between the charging handle and the main body of the firearm, more specifically the upper and lower receiver. A system of one or more charging handles can be configured to form a seal against a receiver, or a combination of them installed on the system that in operation causes or cause the system to perform the actions. One or more charging handles can be configured to form perform particular operations or actions by virtue of including a seal that, when executed by the apparatus, cause the apparatus to prevent gas from blowing in the operator's face. One general aspect includes a charging handle for blocking gasses discharged during firing. The charging also includes a charging handle; a lockable slide latch, and a first lever where the lockable slide latch and lever are integrated into the charge handle and configured to interface against a lower portion of a receiver, where the slide latch is actuated to a locked position by the lever, and where in the locked position the slide latch locks to the receiver to form a seal and prevent a discharge gas from escaping at the interface between charging handle and the receiver. Other embodiments of this aspect include corresponding charging handle, apparatus, and charging handle seals, each configured to prevent discharge gas from escaping past the charge handle.

Implementations may include one or more of the following features. The charging handle where the first lever may include a positive handhold member for actuating the charging handle. The charging handle further may include a second lever may include a positive handhold member for actuating the charging handle. The charging handle is an ambidextrous charging handle may include a second lever where the first lever is configured to a provide a first positive handhold member for actuating the charging handle and where the second lever is configured to a provide a second positive handhold member for actuating the charging handle. The first lever and the second lever are configured to independently unlatch the charging handle from the receiver upper. Implementations of the described techniques may include hardware, a method or process.

One general aspect includes a charging handle for blocking gasses discharged during the operation of a suppressed firearm. The charging also includes a charging handle; a spring-loaded plate, and a first lever where the spring-loaded plate and first lever are integrated into the charge handle and where the spring-loaded plate is configured to seal against a lower portion of a receiver when the first lever is actuated to a locked position. Other embodiments of this aspect include corresponding apparatus or methods configured to perform the actions of the methods.

Implementations may include one or more of the following features. The charging handle where the spring-loaded plate forms a wedge to seal the charging handle against both the lower portion of the receiver and an upper portion of the receiver. Implementations of the described techniques may include apparatus, a method or process.

One general aspect includes a charging handle for blocking gasses discharged during firing. The charging also includes a charging handle; a lockable slide latch integrated into the charging handle where a first lever where the lockable slide latch and lever are integrated into the charge handle and configured to interface against a lower portion of a receiver, where the slide latch is actuated to a locked position by the lever, and where in the locked position the slide latch locks to the receiver to form a seal and prevent a discharge gas from escaping at the interface between charging handle and the receiver. Other embodiments of this aspect include corresponding structures, apparatus, and methods configured to seal the interface between the charging handle and the receiver body.

One general aspect includes a charging handle for blocking gasses discharged during firing. The charging also includes a charging handle; a lockable slide latch integrated into the charging handle and a sealing member configured to form a pneumatic seal against the lower portion of a receiver. Other embodiments of this aspect include corresponding structures, apparatus, and methods configured to seal the interface between the charging handle and the receiver body Implementations may include one or more of the following features. The charging handle where the sealing member is compliant and configured to deform and nest against the lower receiver interface. The sealing member may include an elastic material selectively attached to the charging handle. The sealing member may include an elastic material embedded into a bottom portion of the charging handle main body to form a seal at the charging handle receiver interface. The sealing member may include a fibrous material selectively attached to the charging handle and configured to create a pneumatic turbulent barrier at the interface between the charging handle and a receiver. The sealing member may include a fibrous material embedded in the charging handle at the interfaces between the charging handle and a receiver. The sealing member may include a porous material selectively attached to the charging handle and configured to create a pneumatic turbulent barrier at the interface between the charging handle and the receiver. Implementations of the described apparatus and techniques may include structures, a method or process.

The features and advantages of the present disclosure will become more fully apparent from the following description and appended claims or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
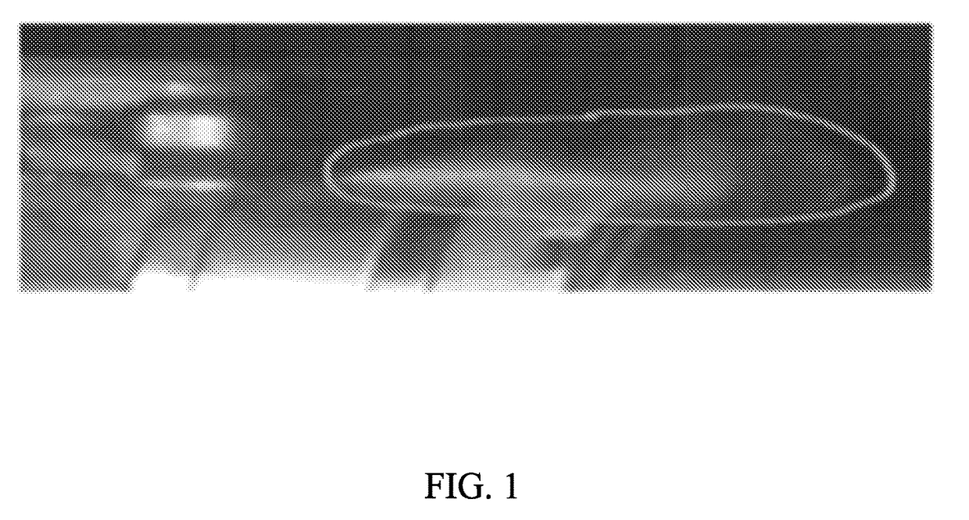
FIG. 1 illustrates a view of gas escaping from interface between the charging handle and the receiver.
Figure 2:
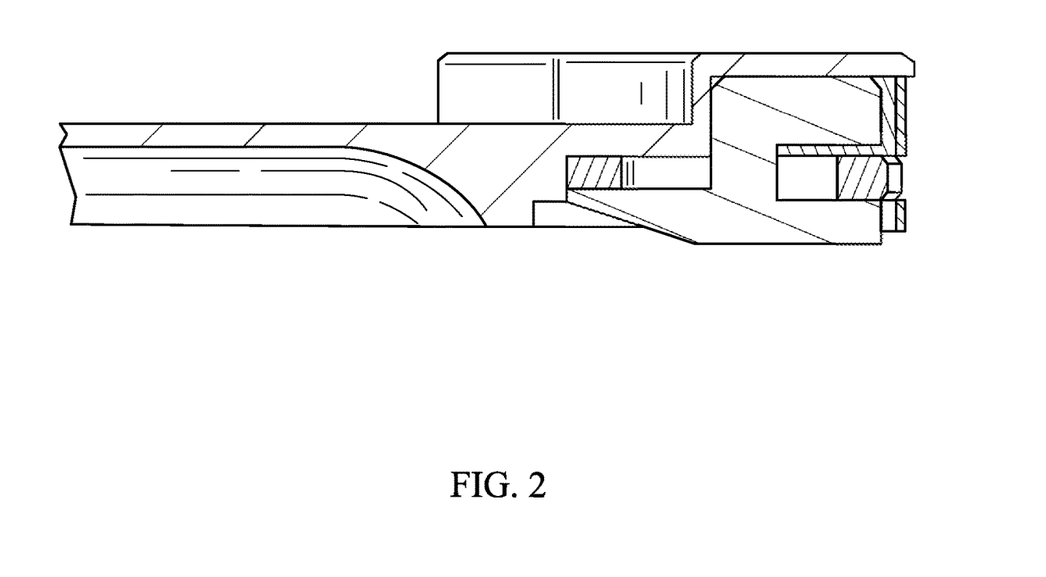
FIG. 2 illustrates a cross-section view of an embodiment of the charging handle.
Figure 3:
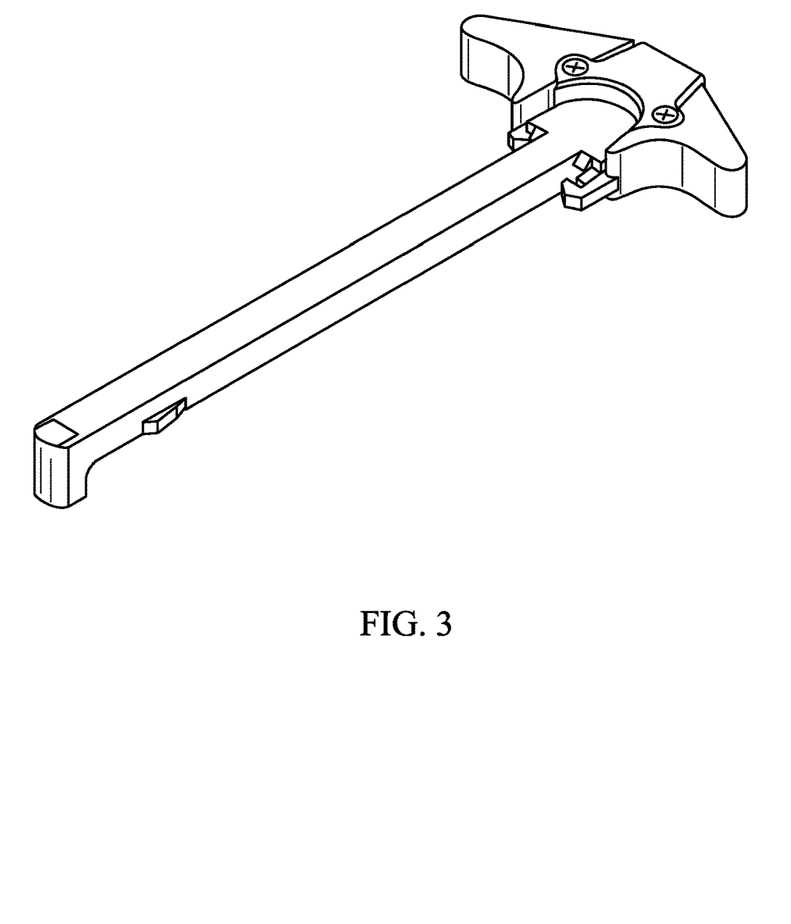
FIG. 3 illustrates the perspective view of an embodiment of the charging handle.
Figure 4:
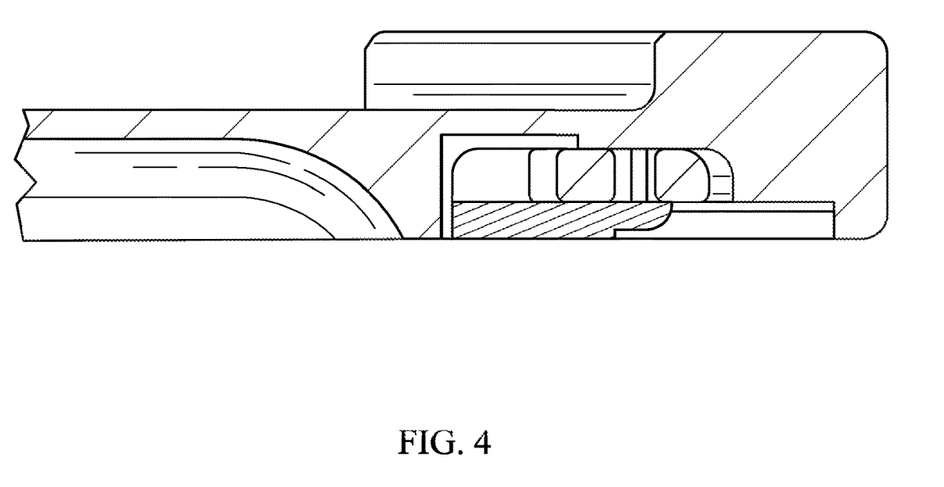
FIG. 4 illustrates a cross-section view of an embodiment of the charging handle.
Figure 5:
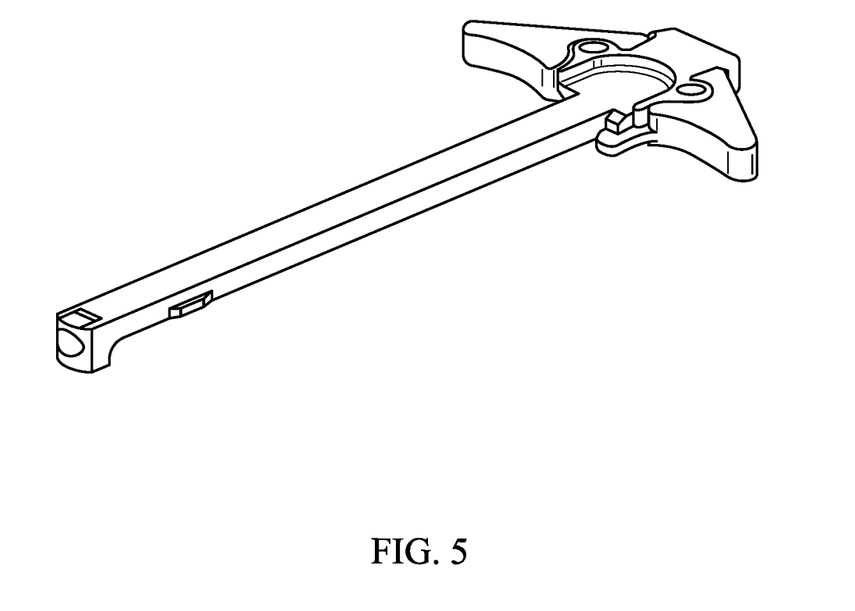
FIG. 5 illustrates the perspective view of an embodiment of the charging handle.
Figure 6:
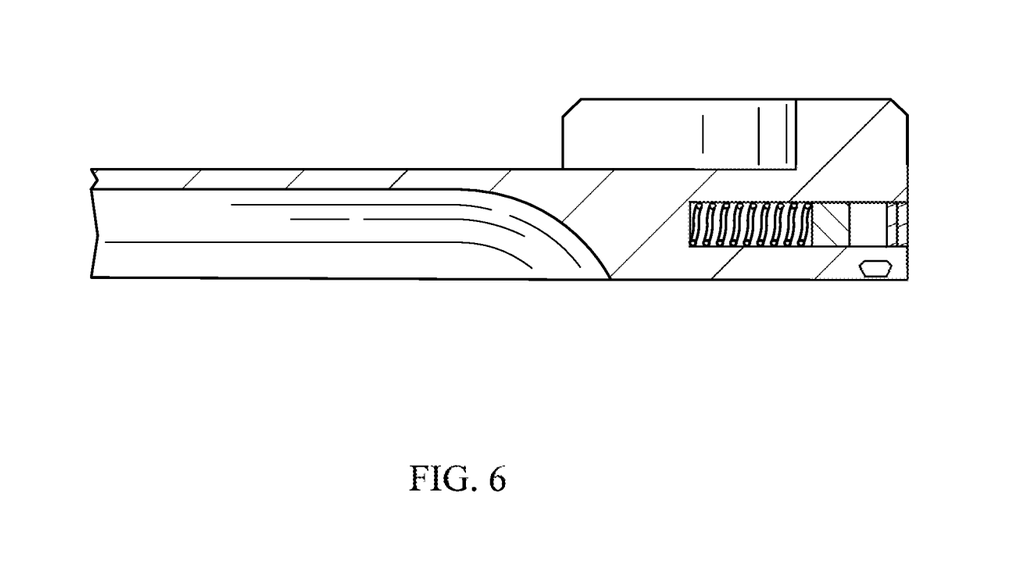
FIG. 6 illustrates a cross-section view of an embodiment of the charging handle
Figure 7:
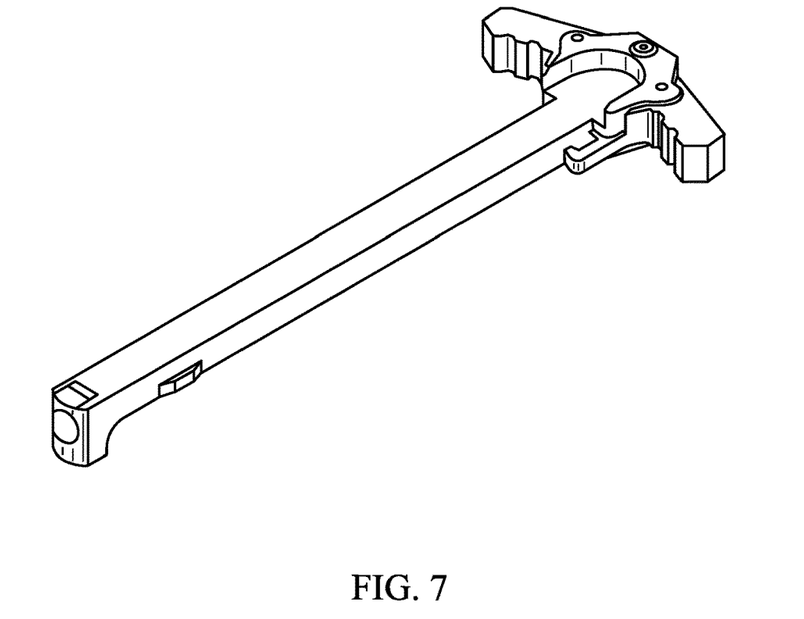
FIG. 7 illustrates the perspective view of an embodiment of the charging handle.
Figure 8:
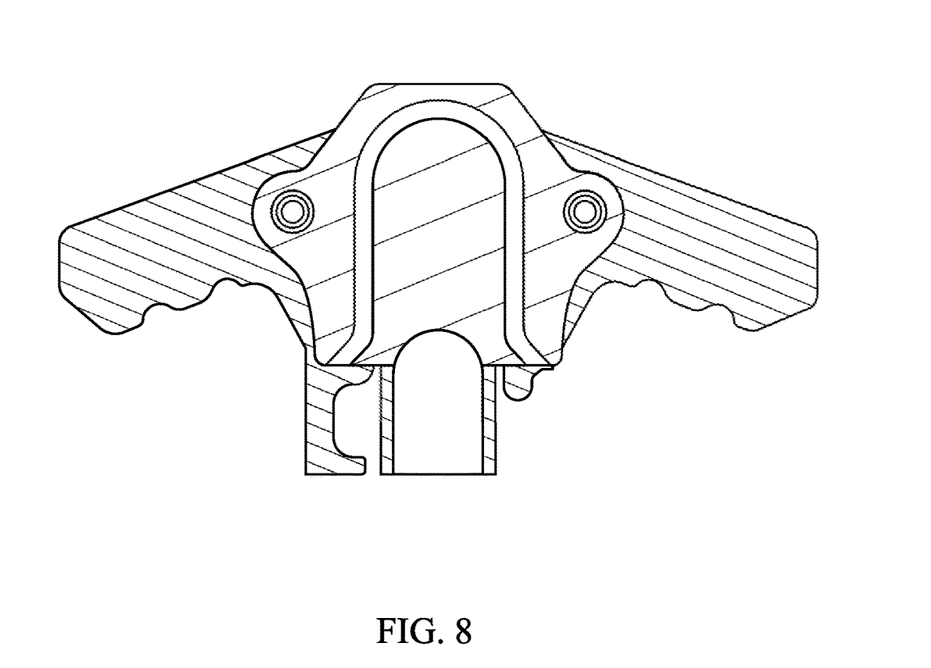
FIG. 8 illustrates the plan view of an embodiment of the charging handle
Figure 9:
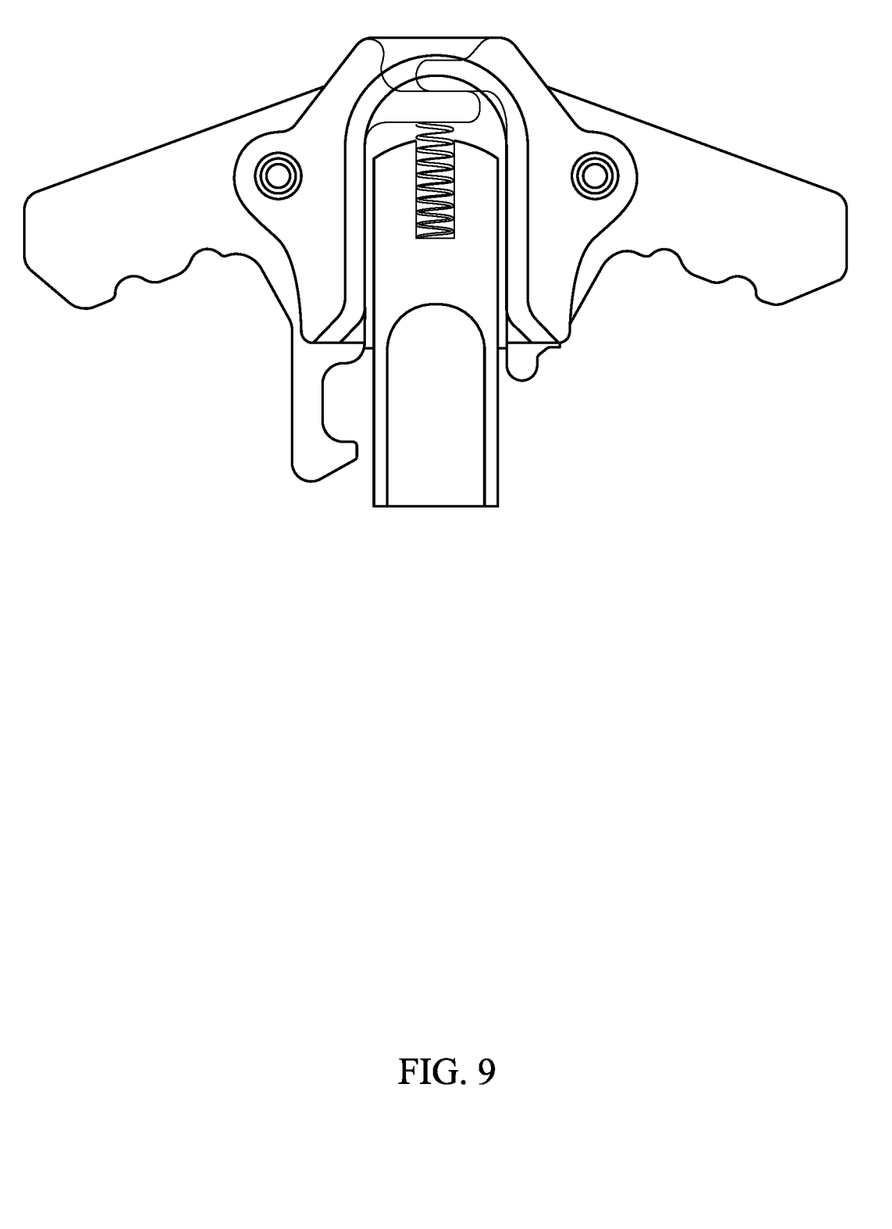
FIG. 9 illustrates a cross-section view of an embodiment of the charging handle
Figure 10A:
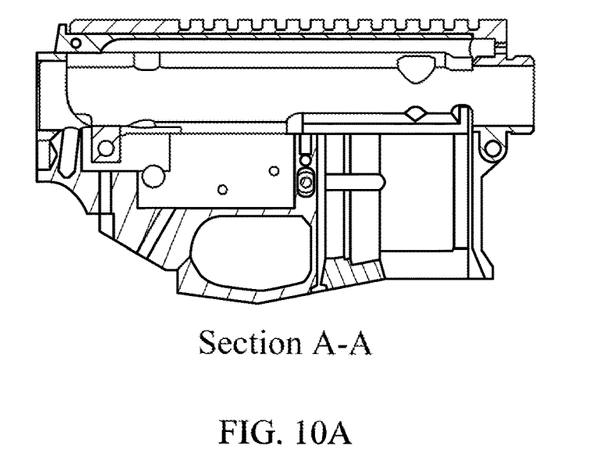
FIG. 10A illustrates a cross-section view of a lower receiver with a sealing member.
Figure 10B:
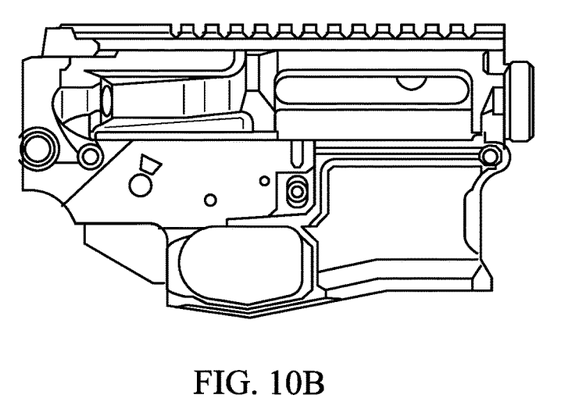
FIG. 10B illustrates a plan view of a lower receiver with a sealing member.
Figure 10C:
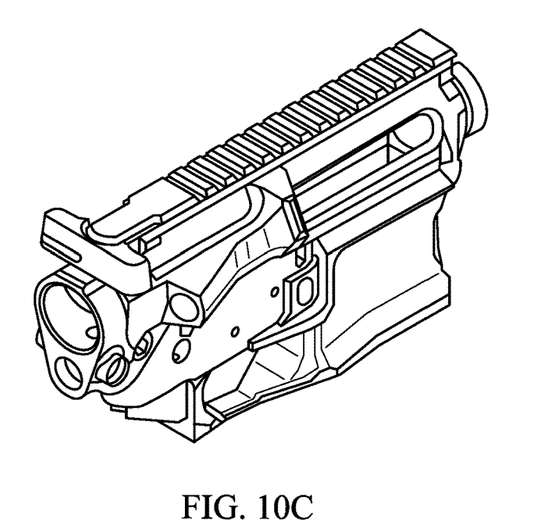
FIG. 10C illustrates a perspective view of a lower receiver with a sealing member.

The present embodiments of the present disclosure will be best understood by reference to the drawings, wherein like parts are designated by like numerals throughout. It will be readily understood that the components of the disclosed invention, as generally described and illustrated in the figures herein, could be arranged and designed in a wide variety of different configurations. Thus, the following more detailed descriptions of the embodiments of the apparatus, as represented in FIGS. 1 through 9, are not intended to limit the scope of the invention, as claimed, but are merely representative of present embodiments of the invention.

In general, the figures disclose an invention that seal the interface between the charging handle and the receiver.

In the following description, references will be made to receivers, discharge gasses, firearms, bullets, casings, and related technology, but these items are not shown in detail in the figures. However, it should be understood that one of ordinary skill in the art and in possession of this disclosure, would readily understand how the present disclosure and existing glove structures can be incorporated.

Detailed references will now be made to the preferred embodiments of the disclosed invention, examples of which are illustrated in FIGS. 1-9 which show various views of a charging handle 1 in accordance with one or more embodiments of the invention.

In some embodiments an ambidextrous firearm charging handle that prevents gases from being expelled directly into the operator's face from the gap between the charging handle and the upper and lower receivers. In some embodiments an ambidextrous charging handle with the primary function to chamber a bullet in the firearm is taught. In some embodiments the unique and necessary feature of the invention is diverting gases that are expelled from the gap between the bottom of the charging handle and the main body of the firearm (specifically the upper and lower receiver) away from the operator.

Some embodiments comprise a single spring without a plunger to bias the handles/levers into the locked position.

In some embodiments features of the charging handle include the ability to chamber a bullet, latch to the upper receiver of the firearm and to block gases that would be expelled into the operator's face during operation of a suppressed AR-15. Optionally the charging handle comprises two levers both of which are used as handles during actuation of the charging handle and both of which can independently unlatch the charging handle from the firearm upper to allow the chambering of a bullet.

In some embodiments the invention utilizes a sliding latch—located on the bottom of the charging handle main body—that was actuated with the same levers/handles that also unlatched the charging handle from the firearm's main body. In some embodiments when in the locked position the latch interfaced with the main body of the firearm to stop the gases from being expelled into the operator's face.

Some embodiments use a spring-loaded plate—located on the bottom of the charging handle main body—that interfaced with the main body of the firearm to stop the gases from being expelled into the operator's face.

Some embodiments utilize an compliant or elastic material—attached or embedded into the bottom of the charging handle main body—that interfaces with the firearm's main body to stop the gases from being expelled into the operator's face.

Some embodiments utilize a fibrous material—attached or embedded into the bottom of the charging handle—that interfaces with the main body of the firearm to stop the gases from being expelled into the operator's face.

In some embodiments the charging handle main body is constructed of 7075-T6 aluminum or similar material with comparable properties such as carbon fiber composites or aircraft grade polymers.

In some embodiments the handles/levers of the charging handle are constructed of 7075-T6 aluminum or similar material with comparable properties such as carbon fiber composites or aircraft grade polymers.

In some embodiments the spring-loaded plate described herein is constructed of 7075-T6 aluminum or similar material with comparable properties such as carbon fiber composites or aircraft grade polymers.

In some embodiments the latch described herein is constructed of 7075-T6 aluminium or similar material with comparable properties such as carbon fiber composites or aircraft grade polymers. In some embodiments the elastic material described herein is constructed of Viton rubber or similar material with comparable properties such as silicone, natural rubber or other elastomers.—Any material that can be used for an O-ring would be an appropriate alternative.

In some embodiments the fibrous material taught herein is constructed out of felt or similar material with comparable properties such as cotton or polyester.—Any material that would commonly be used to make clothes would be an appropriate alternative.

In some embodiments the porous material described herein is constructed of a polyurethane foam or similar material with comparable properties such as latex foam.—Any material that could be used as a shoe insole would be an appropriate alternative.

In some embodiments comprise a porous material—attached or embedded into the bottom of the charging handle—that interfaces with the main body of the firearm to stop the gases from being expelled into the operator's face.

Some embodiments comprise sealing the gap between the bottom of the charging handle and the main body of the firearm (specifically the upper and lower receivers). In some embodiments the use of a single spring without a plunger to bias the handles/levers into the locked position.

Alternative embodiments may comprise fabric or foam sealing members, the removal of the ambidextrous feature, a more durable material to use at the interface between the charging handle and the main body of the firearm (it currently is Viton rubber), changing materials the charging handle is constructed from to any number of polymers or composites.

Though high speed video the source of the puff of discharge gas was of identified smoke clouds being expelled from the firearm allowing identification of the area causing gas in the operator's face while shooting an AR-15 with a suppressor.

The longevity of the elastic material (O-ring). After 1000 cycles of the charging handle the O-ring still blocked any gases from being expelled from between the charging handle and the main body of the firearm into the operators face. The location that gases were expelled from the firearm into the operators face.

In some embodiments the sealing member comprises an integrated O-ring wherein an O-ring is integrated into the receiver and disposed at the interface between the bottom surface of the charging handle and the top surface of the lower receiver. In some embodiments the integrated O-ring is a rubber cylinder. In some embodiments the integrated O-ring is graphite packing. In some embodiments the integrated O-ring is other material disclosed herein. In some embodiments the integrated O-ring is received into the lower receiver in a channel or lacuna formed in the top surface of the lower receiver. In some embodiments the channel is U-shaped with the base of the U-shape extending substantially across the width of the charging handle-lower receiver interface. In some embodiments the arms of the U extend along the surface of the lower receiver, along the primary axis of the charging handle toward the muzzle. In some embodiments a sealing member is shaped as a straight bar. In some embodiments the O-ring is positioned at the stock-end of the charging handle. In some embodiments the O-ring is positioned between the stock-end of the charging handle and the stalk. In some embodiments the O-ring is positioned between the end of the charging handle and the muzzle. However, in each placement the O-ring is configured to close the gap between the charging handle and the lower receiver.

In some embodiments the O-ring comprises the sealing member. Some embodiments comprise a combination of sealing members disposed at the charging handle-lower receiver interface, with a first sealing member on the lower receiver and a second sealing member on the charging handle. In some embodiments the first member and the second sealing member are shaped to improve the seal between the two sealing members. In some embodiments the combination shape may comprise a tongue and groove. In some embodiments the combination may comprise a dove tail. In some embodiments the shape may be a wedge so the force of contact between the first sealing member and the second sealing member increases as the charging handle moves forward and places the bolt carrier group into battery.

In closing, it is to be understood that the embodiments of the disclosure disclosed herein are illustrative of the principles of the present disclosure. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. A lower receiver, comprising:
 a channel formed on a top surface of the lower receiver and configured to receive a sealing member therein, wherein the sealing member is configured to fill a gap between the top surface of the lower receiver and a bottom surface of a charging handle.

2. The lower receiver of claim 1, wherein the sealing member is configured to fill the gap when the charging handle is actuated to a locked position.

3. The lower receiver of claim 1, wherein the sealing member forms a pneumatic seal against the bottom surface of the charging handle.

4. The lower receiver of claim 1, wherein the sealing member is compliant and configured to deform and nest against the bottom surface of the charging handle.

5. The lower receiver of claim 1, wherein the sealing member comprises an elastic material and is selectively attached to the channel.

6. The lower receiver of claim 1, wherein the sealing member comprises an elastic material and is embedded into the channel.

7. The lower receiver of claim 1, wherein the sealing member comprises a fibrous material configured to create a pneumatic turbulent barrier at an interface between the sealing member and the bottom surface of the charging handle.

8. The lower receiver of claim 1, wherein the sealing member comprises a porous material configured to create a pneumatic turbulent barrier at an interface between the sealing member and the bottom surface of the charging handle.

9. The lower receiver of claim 1, wherein the channel has a U-shape, a base of the U-shape extending substantially across a width of an interface between the top surface of the lower receiver and the bottom surface of the charging handle.

10. The lower receiver of claim 1, wherein the channel is bar-shaped, the channel extending substantially across a width of an interface between the top surface of the lower receiver and the bottom surface of the charging handle.

11. A firearm, comprising:
a charging handle; and
a lower receiver, wherein:
the lower receiver comprises a channel formed on a top surface of the lower receiver and configured to receive a first sealing member therein, and
the charging handle comprises a channel formed on a bottom surface of the charging handle and configured to receive a second sealing member therein, wherein the first sealing member, the second sealing member, or both is configured to fill a gap between the top surface of the lower receiver and the bottom surface of the charging handle.

12. The firearm of claim 11, wherein an interface between the first sealing member and the second sealing member is a tongue-and-groove interface.

13. The firearm of claim 11, wherein an interface between the first sealing member and the second sealing member is a dovetail interface.

14. The firearm of claim 11, wherein an interface between the first sealing member and the second sealing member is a wedge interface configured to increase a force of contact between the first sealing member and the second sealing member as the charging handle is actuated to a locked position.

15. The firearm of claim 11, wherein:
the first sealing member comprises an elastic material and is selectively attached to the channel of the lower receiver, and
the second sealing member comprises the elastic material and is selectively attached to the channel of the charging handle.

16. The firearm of claim 11, wherein:
the first sealing member comprises an elastic material and is embedded in the channel of the lower receiver, and
the second sealing member comprises the elastic material and is embedded in the channel of the charging handle.

17. The firearm of claim 11, wherein:
the first sealing member comprises a fibrous material configured to create a pneumatic turbulent barrier at an interface between the first sealing member and the bottom surface of the charging handle, and
the second sealing member comprises the fibrous material and is configured to create the pneumatic turbulent barrier at the interface between the second sealing member and the bottom surface of the charging handle.

18. The firearm of claim 11, wherein:
the first sealing member comprises a porous material configured to create a pneumatic turbulent barrier at an interface between the first sealing member and the bottom surface of the charging handle, and
the second sealing member comprises the porous material and is configured to create the pneumatic turbulent barrier at the interface between the second sealing member and the bottom surface of the charging handle.

\* \* \* \* \*